US010826376B1

United States Patent
Kim et al.

(10) Patent No.: US 10,826,376 B1
(45) Date of Patent: Nov. 3, 2020

(54) SWITCH CONTROLLER AND COMPENSATION METHOD OF VALLEY DETECTION ERROR

(71) Applicant: SEMICONDUCTOR COMPONENTS INDUSTRIES, LLC, Phoenix, AZ (US)

(72) Inventors: JooHoon Kim, Bucheon (KR); Jintae Kim, Seongnam-si (KR); Jihoon Jang, Incheon (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/674,505

(22) Filed: Nov. 5, 2019

(51) Int. Cl.
*H02M 1/00* (2006.01)
*H02M 1/08* (2006.01)
*H02M 3/335* (2006.01)

(52) U.S. Cl.
CPC ......... *H02M 1/08* (2013.01); *H02M 3/33523* (2013.01)

(58) Field of Classification Search
CPC ............ H02M 1/08; H02M 1/36; H02M 3/22; H02M 3/24; H02M 3/325; H02M 3/335; H02M 3/28
See application file for complete search history.

(56) References Cited

U.S. PATENT DOCUMENTS

| 6,256,210 | B1 | 7/2001 | Strijker et al. | |
|---|---|---|---|---|
| 8,917,527 | B2* | 12/2014 | Fang | H02M 1/08 363/21.12 |
| 9,128,500 | B2 | 9/2015 | Daniel et al. | |
| 2010/0165672 | A1* | 7/2010 | Li | H02M 3/33507 363/21.16 |
| 2011/0095735 | A1 | 4/2011 | Lin | |
| 2014/0246988 | A1* | 9/2014 | Chen | H05B 45/37 315/223 |

OTHER PUBLICATIONS

ON Semiconductor, "NCP1380, Quasi-Resonant Current-Mode Controller for High-Power Universal Off-Line Supplies," Rev. 6, Feb. 2018.

* cited by examiner

*Primary Examiner* — Adolf D Berhane
*Assistant Examiner* — Afework S Demisse
(74) *Attorney, Agent, or Firm* — AMPACC Law Group, PLLC (57) ABSTRACT

A method operates a switch controller of a power switch. The method includes determining a compensation value based on a quarter period of a resonant cycle of a drain voltage and a propagation delay time, the drain voltage being a voltage at a drain of the power switch, generating a sensing signal based on detection of a valley point of the drain voltage, and generating a control signal for controlling the power switch based on the sensing signal and the compensation value to turn on the power switch at a time corresponding to the valley point of the drain voltage.

20 Claims, 8 Drawing Sheets

SWITCH CONTROLLER AND COMPENSATION METHOD OF VALLEY DETECTION ERROR

BACKGROUND

The present disclosure relates to a switch controller and a method capable of compensating for a valley detection error due to a propagation delay, and to a power converter including the switch controller.

Among various power converters, a flyback converter is a buck-boost converter where an output inductor is split to form a transformer. In the flyback converter, a power switch is closed to connect the primary winding of the transformer to an input voltage source. Closing the power switch increases a primary-side current and magnetic flux, stores energy in the transformer, and induces a current on the secondary winding of the transformer. The induced current has a polarity that places a diode rectifier in reverse bias to block charging of an output capacitor. When the power switch is opened, the primary-side current and magnetic flux drop, and the current on the secondary winding changes the polarity to thereby forward bias the diode rectifier and allows charging of the output capacitor to generate a DC output voltage.

In the flyback converter, the detection of a lowest voltage in a voltage swing (i.e., a voltage valley) is required to determine when to turn on the power switch in order to minimize hard-switching or switching loss. The hard-switching results in significant power dissipation into the power switch. Switching on at the lowest point, i.e., a valley point, of a drain voltage swing of a MOSFET switch, which is used as the power switch, reduces this power dissipation and therefore helps to operate at improved efficiency.

BRIEF SUMMARY

In an embodiment, a method of operating a switch controller of a power switch is disclosed. The method includes determining a compensation value based on a quarter period of a resonant cycle of a drain voltage and a propagation delay time, the drain voltage being a voltage at a drain of the power switch, generating a valley sensing signal by detecting a valley point of the drain voltage, and generating a power switch control signal for controlling the power switch based on the valley sensing signal and the compensation value so that the power switch is turned on at a time corresponding to the valley point of the drain voltage.

In an embodiment, a switch controller of a power switch is disclosed. The switch controller includes a valley detection circuit configured to determine a compensation value based on a quarter period of a resonant cycle of a drain voltage and a propagation delay time, generate a valley sensing signal by detecting a valley point of the drain voltage, and generate a compensated valley sensing signal based on the valley sensing signal and the compensation value, the drain voltage being a voltage at a drain of the power switch, and a switch control circuit configured to generate a power switch control signal for controlling the power switch based on the compensated valley sensing signal so that the power switch is turned on at a time corresponding to the valley point of the drain voltage.

In an embodiment, a power converter includes a transformer including a primary winding and a secondary winding, a power switch including a drain coupled to the primary winding, and a switch controller. The switch controller includes a valley detection circuit configured to determine a compensation value based on a quarter period of a resonant cycle of a drain voltage and a propagation delay time, generate a valley sensing signal by detecting a valley point of the drain voltage, and generate a compensated valley sensing signal based on the valley sensing signal and the compensation value, the drain voltage being a voltage at a drain of the power switch, and a switch control circuit configured to generate a power switch control signal for controlling the power switch based on the compensated valley sensing signal so that the power switch is turned on at a time corresponding to the valley point of the drain voltage.

DETAILED DESCRIPTION

Embodiments of the present disclosure relate to a switch controller and a method for determining a compensation value considering a propagation delay that occurs in the switch controller and automatically compensating for a valley detection error due to the propagation delay using the compensation value, and to a power converter including the switch controller.

In an embodiment, the switch controller determines the compensation value based on a propagation delay time and a quarter period of a resonant cycle of a drain voltage at a drain of a power switch. After the compensation value is determined and saved in a register, when a valley sensing signal is generated by detecting a valley point of the drain voltage, the switch controller generates a power switch control signal for controlling the power switch based on the valley sensing signal and the compensation value, so that the power switch is turned on at a time corresponding to the valley point of the drain voltage.

A detailed description of embodiments is provided below along with accompanying figures. The scope of this disclosure is limited only by the claims and encompasses numerous alternatives, modifications and equivalents. Although steps of various processes are presented in a given order, embodiments are not necessarily limited to the listed order. In some embodiments, certain operations may be performed simultaneously, in an order other than the described order, or not performed at all.

Numerous specific details are set forth in the following description. These details are provided to promote a thorough understanding of the scope of this disclosure by way of specific examples, and embodiments may be practiced according to the claims without some of these specific details. Accordingly, the specific embodiments of this disclosure are illustrative, and are not intended to be exclusive or limiting. For the purpose of clarity, technical material that is known in the technical fields related to this disclosure has not been described in detail so that the disclosure is not unnecessarily obscured.

Figure 1:
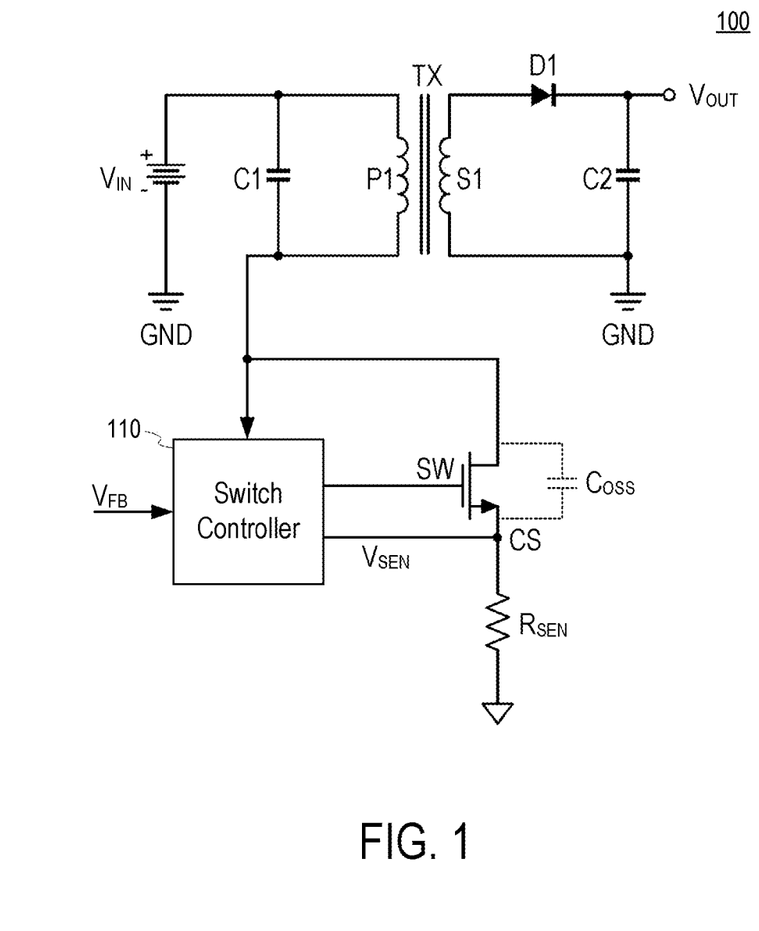
FIG. 1 illustrates a power converter according to an embodiment of the present disclosure.

FIG. 1 illustrates a power converter 100 according to an embodiment of the present disclosure. The power converter 100 may be implemented with a flyback converter 100.

The power converter 100 includes a transformer TX, a power switch SW that is connected in series to a power source VIN and a primary winding P1 of the transformer TX, a first capacitor C1 that is shunt to the primary winding P1, and a switch controller 110 that controls a switching operation of the power switch SW to produce a current on a secondary winding 51 of the transformer TX, so as to charge a second capacitor C2 connected to the secondary winding 51 to thereby produce an output voltage $V_{OUT}$.

In the power converter 100, when the power switch SW is turned off, a current flows from the secondary winding 51 through a diode D1 to charge the second capacitor C2, and a voltage across the power switch SW rises up to a certain value and maintains the certain value for a while. After that, when the current on the secondary winding 51 becomes off, but the power switch SW is still off, the voltage across the power switch SW resonates and thereby has a sinusoidal waveform due to the oscillation of the magnetizing inductance of the transformer TX and the stray capacitance, e.g., $C_{OSS}$, of the power switch SW.

However, when the power switch SW is turned on, the voltage across the power switch SW drops off until the power switch SW is turned off again. To reduce the switching loss of the power switch SW, the best timing to turn on the power switch SW should be when the voltage across the power switch SW is at a minimum, that is, a time corresponding to a valley point of the sinusoidal waveform.

Therefore, a key factor of reducing the switching loss is to precisely detect the valley point of the voltage across the power switch SW during an oscillating or resonant period of the voltage across the power switch SW and to turn on the power switch SW at the time corresponding to the valley point of the voltage across the power switch SW.

In this embodiment, the power switch SW may be implemented with an N-type MOSFET. Therefore, the switch controller 110 detects the valley point of the voltage across the power switch SW by sensing a voltage at a drain of the power switch SW and turns on the power switch SW when the valley point is detected.

However, in an actual operation of the power converter 100, a propagation delay time $T_{pd}$ may be generated by, e.g., components of the switch controller 110 through which a valley sensing signal passes and the capacitance $C_{OSS}$ of the power switch SW. The propagation delay time $T_{pd}$ may make a difference between a first time of detecting the valley point and a second time when the power switch SW is actually turned on. That is, the propagation delay time $T_{pd}$ may cause a valley detection error, which means that the power switch SW is turned on at a time that is delayed for the propagation delay time $T_{pd}$ from the first time of detecting the valley point of the voltage across the power switch SW.

Therefore, in this embodiment, the switch controller 110 calculates a compensation value C that is used to compensate for the propagation delay time $T_{pd}$ and controls a turn-on time of the power switch SW using the compensation value C so that the power switch SW is actually turned on at the first time of detecting the valley point of the voltage across the power switch SW.

The switch controller 110 internally calculates the compensation value C without using external elements and stores the compensation value C therein, at an initialization stage of the power converter 100. At the initialization stage, the switch controller 110 may be installed in the power converter 100 and operate to tune its characteristics including the compensation value C. After that, when the power converter 100 operates in a normal operation, the switch controller 110 uses the stored compensation value C to compensate for the valley detection error due to the propagation delay time $T_{pd}$, so that the power switch SW can be turned on at the first time of detecting the valley point of the voltage across the power switch SW.

In addition, the switch controller 110 controls a turn-off time of the power switch SW based on a feedback voltage $V_{FB}$ and a sense voltage $V_{SEN}$. The feedback voltage $V_{FB}$ is fed back from a secondary side of the transformer TX, and is determined depending on a load at the secondary side. For example, when the load is great, the feedback voltage $V_{FB}$ has a high voltage level. On the other hand, when the load is small, the feedback voltage $V_{FB}$ has a low voltage level. The sense voltage $V_{SEN}$ is a voltage determined at one end CS of a sensing resistor $R_{SEN}$ that is coupled to the power switch SW by sensing a current flowing through the power switch SW. The operation of determining the turn-off time of the power switch SW using the feedback voltage $V_{FB}$ and the sense voltage $V_{SEN}$ is well known. Accordingly, a detailed description thereof will be omitted.

Figure 2:
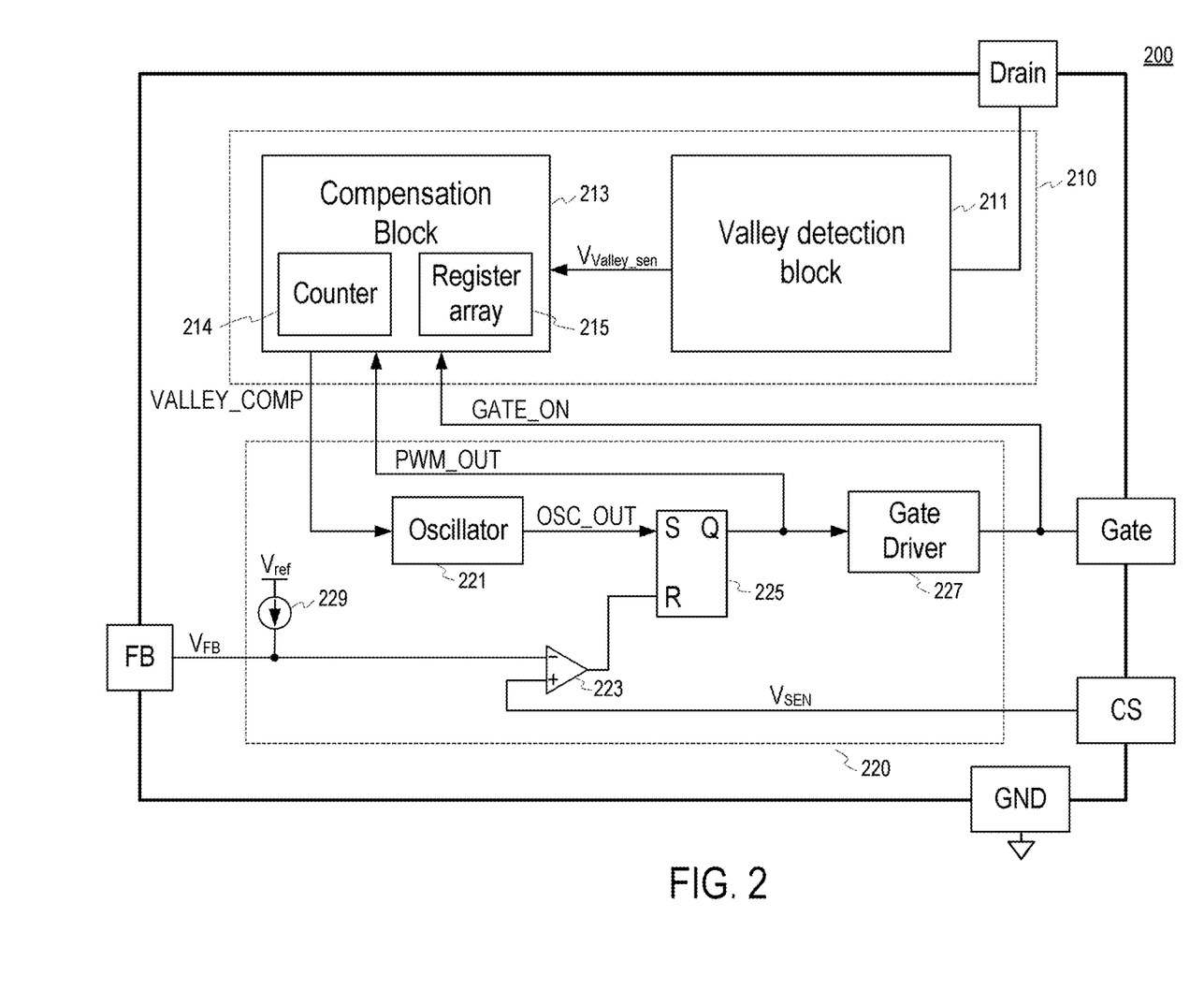
FIG. 2 illustrates a switch controller according to an embodiment of the present disclosure.

FIG. 2 illustrates a switch controller 200 according to an embodiment of the present disclosure. The switch controller 200 may correspond to the switch controller 110 shown in FIG. 1. The switch controller 200 will be described with reference to the power converter 100 of FIG. 1.

Referring to FIG. 2, the switch controller 200 includes an auto-tuning valley detection circuit 210 and a switch control circuit 220.

The auto-tuning valley detection circuit 210 is coupled to a drain of the power switch SW of FIG. 1. The auto-tuning valley detection circuit 210 detects a valley point of a voltage at the drain of the power switch SW, generates a valley sensing signal $V_{Valley\_sen}$ based on the detection of the valley point, calculates a compensation value C based on the valley sensing signal $V_{Valley\_sen}$ and a propagation delay time $T_{pd}$ and stores the compensation value C therein at an initialization stage, and outputs the compensated valley sensing signal VALLEY_COMP to the switch control circuit 220 in a normal operation of the power converter 100. In the normal operation, the compensated valley sensing signal VALLEY_COMP is generated based on the compensation value C and the valley sensing signal $V_{Valley\_sen}$.

The switch control circuit 220 generates a power switch control signal GATE_ON based on a feedback voltage $V_{FB}$, a sense voltage $V_{SEN}$, and the compensated valley sensing signal VALLEY_COMP from the auto-tuning valley detection circuit 210. The power switch control signal GATE_ON is enabled to a first level, e.g., a high level, in order to turn on the power switch SW, and disabled to a second level, e.g., a low level, in order to turn off the power switch SW.

In the initialization stage, the power switch control signal GATE_ON is enabled to the first level based on a fixed frequency, and disabled to the second level by a switch turn-off control signal generated based on the feedback voltage $V_{FB}$ and the sense voltage $V_{SEN}$. In the normal operation, the power switch control signal GATE_ON is enabled by the compensated valley sensing signal VALLEY_COMP, and disabled by the switch turn-off control signal. That is, a turn-on time of the power switch SW is determined by the compensated valley sensing signal VALLEY_COMP, and a turn-off time of the power switch SW is determined by the switch turn-off control signal.

The auto-tuning valley detection circuit 210 includes a valley detection block 211 and a compensation block 213.

The valley detection block 211 detects the valley point of the voltage at the drain of the power switch SW by sensing the resonance of the voltage at the drain of the power switch SW, and outputs the valley sensing signal $V_{Valley\_sen}$ to the compensation block 213.

The compensation block 213 calculates the compensation value C for compensating for the propagation delay time $T_{pd}$ and stores the compensation value C therein, at the initialization stage. The compensation block 213 generates the compensated valley sensing signal VALLEY_COMP based on the compensation value C and the valley sensing signal $V_{Valley\_sen}$, and outputs the compensated valley sensing signal VALLEY_COMP to the switch control circuit 220, in the normal operation.

In an embodiment, the propagation delay time $T_{pd}$ is determined by detecting a phase difference between a first edge of a pulse width modulation (PWM) output signal PWM_OUT and a first edge of the power switch control signal GATE_ON. The first edge of the power switch control signal GATE_ON is generated based on the first edge of the PWM output signal PWM_OUT, but is delayed for the phase difference from the first edge of the PWM output signal PWM_OUT. Thus, the propagation delay time $T_{pd}$ may correspond to the phase difference. The power switch SW is turned on at the first edge of the power switch control signal GATE_ON. However, embodiments are not limited thereto. In another embodiment, second edges of the PWM output signal PWM_OUT and the power switch control signal GATE_ON that are associated with each other may be used to detect the phase difference. In an embodiment, the first edge is a rising edge, and the second edge is a falling edge.

In an embodiment, the compensation block 213 may include a counter 214 and a register array 215 to perform its operations such as calculating and storing the compensation value C, generating the compensated valley sensing signal VALLEY_COMP, measuring and storing the propagation delay time $T_{pd}$ and a pulse width of the valley sensing signal $V_{Valley\_sen}$, and so on. The operations of the compensation block 213 will be described in detail later with reference to FIGS. 5 to 8.

The switch control circuit 220 includes an oscillator 221, a comparator 223, an RS flip-flop 225, a gate driver 227, and a current source 229. The oscillator 221 and the RS flip-flop 225 together may be referred to as a 'PWM controller.'

The oscillator 221 generates an oscillation output signal OSC_OUT. The oscillator 221 operates in one of two modes. In a first mode when a first valley point of the voltage at the drain of the power switch SW is not detected and thus the compensation value C is not determined by the auto-tuning valley detection circuit 210, the oscillator 221 operates at a fixed frequency. In the first mode, since the first valley point of the voltage at the drain of the power switch SW is not detected yet and thus the compensation value C is not determined and stored, the compensated valley sensing signal VALLEY_COMP is not output to the oscillator 221.

That is, in the first mode, the generation of the oscillation output signal OSC_OUT does not depend on the generation of the compensated valley sensing signal VALLEY_COMP. Therefore, the turn-on time of the power switch SW is determined by an output signal of the oscillator 221 that is generated at the fixed frequency. The oscillator 221 operates in the first mode at the initialization stage.

In a second mode when the compensation value C is determined and stored in the auto-tuning valley detection circuit 210, the oscillator 221 generates the oscillation output signal OSC_OUT based on the compensated valley sensing signal VALLEY_COMP that is generated using the valley sensing signal $V_{Valley\_sen}$ and the compensation value C. The oscillator 221 operates in the second mode in the normal operation.

The comparator 223 compares a voltage corresponding to the feedback voltage $V_{FB}$ with the sense voltage $V_{SEN}$, and generates the switch turn-off control signal for turning off the power switch SW based on a comparison result. The switch turn-off control signal is input to the RS flip-flop 225.

The current source 229 supplies a current to a node of the feedback voltage $V_{FB}$ based on a reference voltage $V_{ref}$ to thereby maintain the feedback voltage $V_{FB}$ to correspond to the output voltage $V_{OUT}$ of the power converter 100 of FIG. 1.

The RS flip-flop 225 generates the PWM output signal PWM_OUT based on the oscillation output signal OSC_OUT output from the oscillator 221 and the switch turn-off control signal output from the comparator 223. The rising edge of the PWM output signal PWM_OUT to determine the turn-on time of the power switch SW is determined by the oscillation output signal OSC_OUT, and the falling edge of the PWM output signal PWM_OUT to determine the turn-off time of the power switch SW is determined by the switch turn-off control signal output from the comparator 223. For example, the rising edge of the PWM output signal PWM_OUT is synchronized with the oscillation output signal OSC_OUT, and the falling edge of the PWM output signal PWM_OUT is synchronized with the switch turn-off control signal.

The oscillation output signal OSC_OUT is input to the RS flip-flop 225 through a set (S) input terminal, and the switch turn-off control signal is input to the RS flip-flop through a reset (R) input terminal.

The gate driver 227 generates the power switch control signal GATE_ON based on the PWM output signal PWM_OUT. The power switch control signal GATE_ON may have a pulse width that is substantially the same as a pulse width of the PWM output signal PWM_OUT, but is generated to have a phase difference corresponding to the propagation delay time $T_{pd}$ between the PWM output signal PWM_OUT and the power switch control signal GATE_ON. The power switch control signal GATE_ON is input to a gate of the power switch SW to control a switching operation of the power switch SW.

FIG. 2 illustrates the switch controller 200 only implemented in an integrated circuit (IC) chip. However, embodiments are not limited thereto. In another embodiment, both of the switch controller 200 shown in FIG. 2 and the power switch SW and the sensing resistor $R_{SEN}$ shown in FIG. 1 are implemented in a single IC chip. That is, the power switch SW and the sensing resistor $R_{SEN}$ can be included in the IC chip of FIG. 2.

Figure 3:
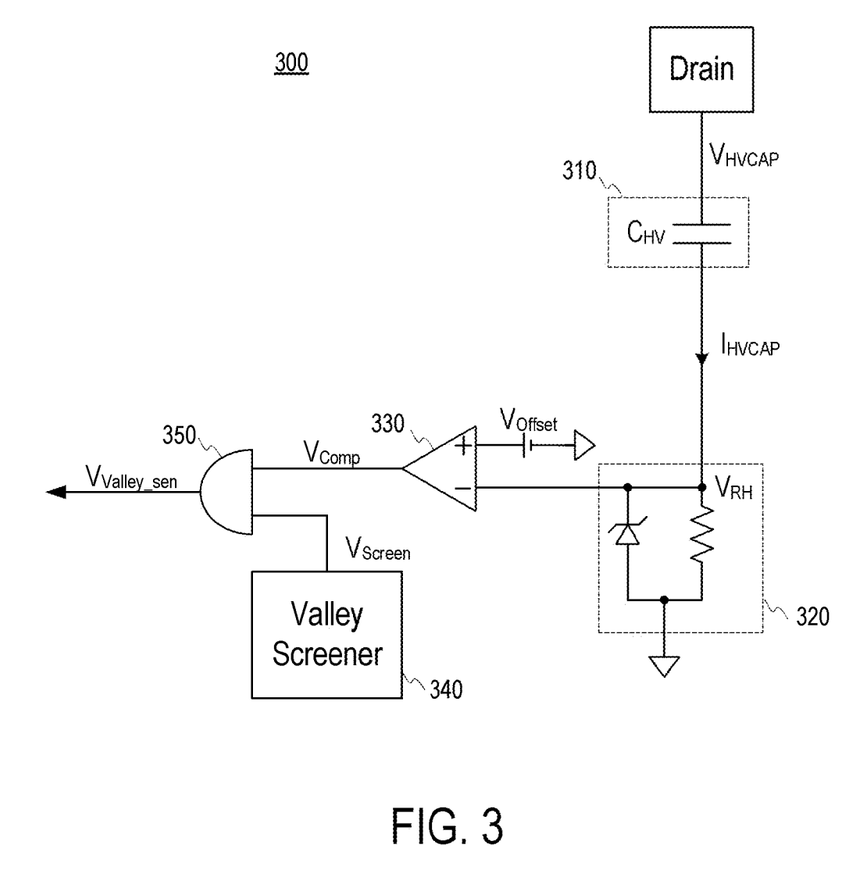
FIG. 3 illustrates a valley detection block according to an embodiment of the present disclosure.

FIG. 3 illustrates a valley detection block 300 according to an embodiment of the present disclosure. The valley detection block 300 of FIG. 3 may correspond to the valley detection block 211 shown in FIG. 2.

Figure 4:
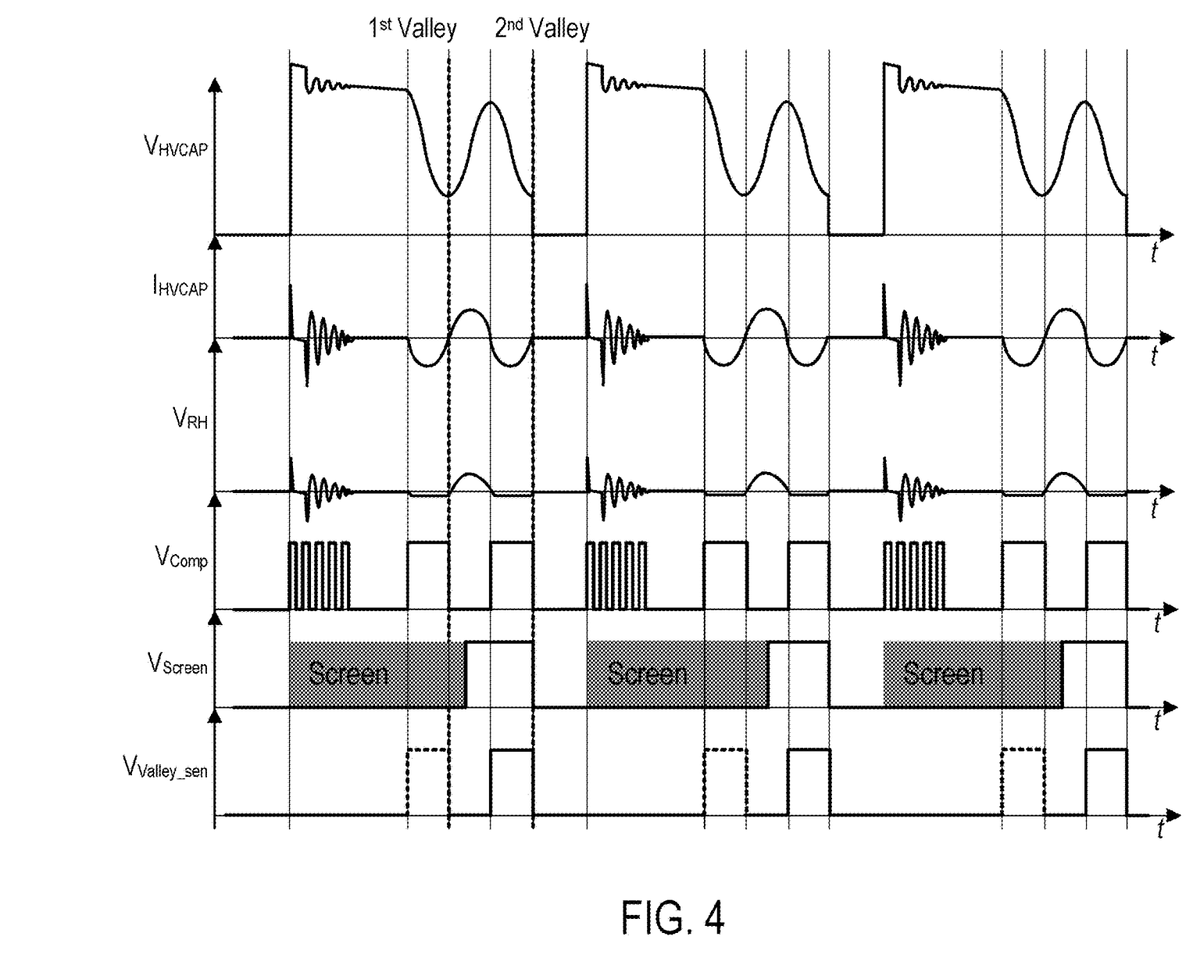
FIG. 4 is a waveform diagram illustrating an operation of the valley detection block of FIG. 3 according to an embodiment of the present disclosure.

FIG. 4 is a waveform diagram illustrating an operation of the valley detection block 300 of FIG. 3 according to an embodiment of the present disclosure. The operation of the valley detection block 300 illustrated in FIG. 4 may be performed during the normal operation of the power converter 100 of FIG. 1.

Referring to FIG. 3, the valley detection block 300 includes a differentiator 310, a voltage regulator 320, and a valley sensing signal generator. The valley sensing signal generator includes a comparator 330, a valley screener 340, and an AND gate 350.

The differentiator 310 detects or senses a valley point of a voltage $V_{HVCAP}$ at the drain of the power switch SW during an oscillating or resonant period of the voltage $V_{HVCAP}$. The differentiator 310 includes a high voltage capacitor $C_{HV}$. The capacitance of the high voltage capacitor $C_{HV}$ may be determined according to a frequency and a swing width of the voltage $V_{HVCAP}$. For example, as the frequency and the swing width of the voltage $V_{HVCAP}$ are lower, the capacitance of the high voltage capacitor $C_{HV}$ should be greater. In an embodiment, the capacitance of the high voltage capacitor $C_{HV}$ may be 150 fF, but embodiments are not limited thereto.

The differentiator 310 detects the valley point by sensing the resonance of the voltage $V_{HVCAP}$ using the high voltage capacitor $C_{HV}$, which has a first end coupled to the drain of the power switch SW and a second end coupled to the voltage regulator 320. Referring to FIG. 4, the oscillating voltage $V_{HVCAP}$, which is applied to the high voltage capacitor $C_{HV}$, is converted into a current $I_{HVCAP}$.

As shown in FIG. 4, when a level of the oscillating voltage $V_{HVCAP}$ repeatedly drops off and rises up, a current flow direction of the current $I_{HVCAP}$ is changed between a forward direction and a reverse direction, so that the current $I_{HVCAP}$ has a sinusoidal waveform. The valley point of the voltage $V_{HVCAP}$ is detected at a point where the current $I_{HVCAP}$ becomes zero when the current flow direction of the current $I_{HVCAP}$ is changed from the reverse direction to the forward direction, i.e., when a value of the current $I_{HVCAP}$ is changed from negative to positive. In an embodiment, the forward direction corresponds to a direction from the first end to the second end of the capacitor $C_{HV}$, and the reverse direction corresponds to a direction from the second end to the first end of the capacitor $C_{HV}$.

The voltage regulator 320 regulates the current $I_{HVCAP}$ and outputs a regulated voltage $V_{RH}$. The current $I_{HVCAP}$ having a negative value is filtered out by the voltage regulator 320, so that the regulated voltage $V_{RH}$ having a positive level only is generated. The regulated voltage $V_{RH}$ is provided to a negative (−) input terminal of the comparator 330. In an embodiment, the voltage regulator 320 includes a Zener diode and a resistor connected in parallel between the second end of the high voltage capacitor $C_{HV}$ and a ground voltage terminal.

The comparator 330 compares the regulated voltage $V_{RH}$ with its offset voltage $V_{Offset}$, and outputs a comparison voltage signal $V_{Comp}$. The regulated voltage $V_{RH}$ is provided to a negative (−) input terminal of the comparator 330, and the offset voltage $V_{Offset}$ is provided to a positive (+) input terminal of the comparator 330. The offset voltage $V_{Offset}$ may have a preset value depending on a characteristic of the comparator 330, but, in an ideal condition, the offset voltage $V_{Offset}$ may have 0 V.

As shown in FIG. 4, when a level of the regulated voltage $V_{RH}$ is lower than that of the offset voltage $V_{Offset}$, the comparator 330 outputs the comparison voltage signal $V_{Comp}$ having a high level. On the other hand, when the level of the regulated voltage $V_{RH}$ increases and thus becomes equal to or higher than that of the offset voltage $V_{Offset}$, the comparator 330 outputs the comparison voltage signal $V_{Comp}$ having a low level.

The valley screener 340 provides a screening signal $V_{Screen}$ to selectively pass one or more pulses of the comparison voltage signal $V_{Comp}$ that are respectively generated by detecting one or more valley points of the oscillating voltage $V_{HVCAP}$. The screening signal $V_{Screen}$ provides a filtering window for passing one of the one or more pulses of the comparison voltage signal $V_{Comp}$.

The AND gate 350 passes one of the one or more pulses of the comparison voltage signal $V_{Comp}$ that is included in the filtering window of the screening signal $V_{Screen}$ as a valley sensing signal $V_{Valley\_sen}$. That is, one pulse of the comparison voltage signal $V_{comp}$ that overlaps the screening signal $V_{Screen}$ is output as the valley sensing signal $V_{Valley\_sen}$. The AND gate 350 receives the comparison voltage signal $V_{Comp}$ through its first input terminal and the screening signal $V_{Screen}$ through its second input terminal, and outputs the valley sensing signal $V_{Valley\_sen}$ through its output terminal.

In an embodiment, the screening signal $V_{Screen}$ is determined according to a level of the feedback voltage $V_{FB}$ that corresponds to an amount of a load at the secondary side of the transformer TX of FIG. 1. However, embodiments are not limited thereto.

In another embodiment, the screening signal $V_{Screen}$ is predetermined to pass a pulse of the comparison voltage signal $V_{Comp}$ that corresponds to a certain valley point. For example, in FIG. 4, the screening signal $V_{Screen}$ is predetermined to have a filtering window for passing a pulse of the comparison voltage signal $V_{Comp}$ that corresponds to a second valley point of the voltage $V_{HVCAP}$. In another example, a pulse of the comparison voltage signal $V_{Comp}$ that corresponds to a first valley point of the voltage $V_{HVCAP}$ may be output as the valley sensing signal $V_{Valley\_sen}$.

The valley sensing signal $V_{Valley\_sen}$ corresponding to the passed pulse of the comparison voltage signal $V_{Comp}$ has a pulse width corresponding to a quarter period of one resonant cycle of the voltage $V_{HVCAP}$. The valley sensing signal $V_{Valley\_sen}$ is provided to the compensation block 213 shown in FIG. 2.

Figure 5:
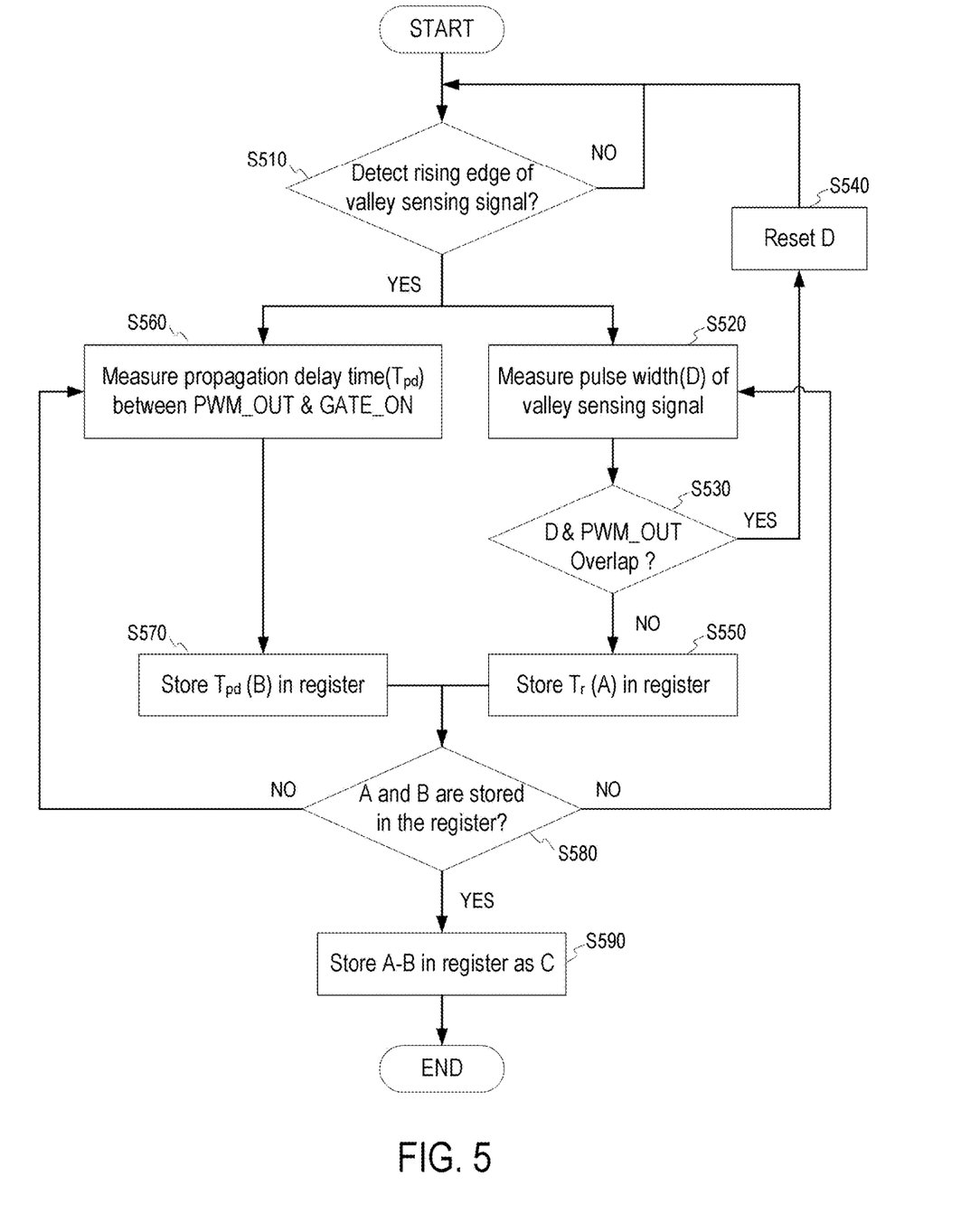
FIG. 5 is a flow chart illustrating an operation of acquiring a compensation value of a switch controller according to an embodiment of the present disclosure.
Figure 6:
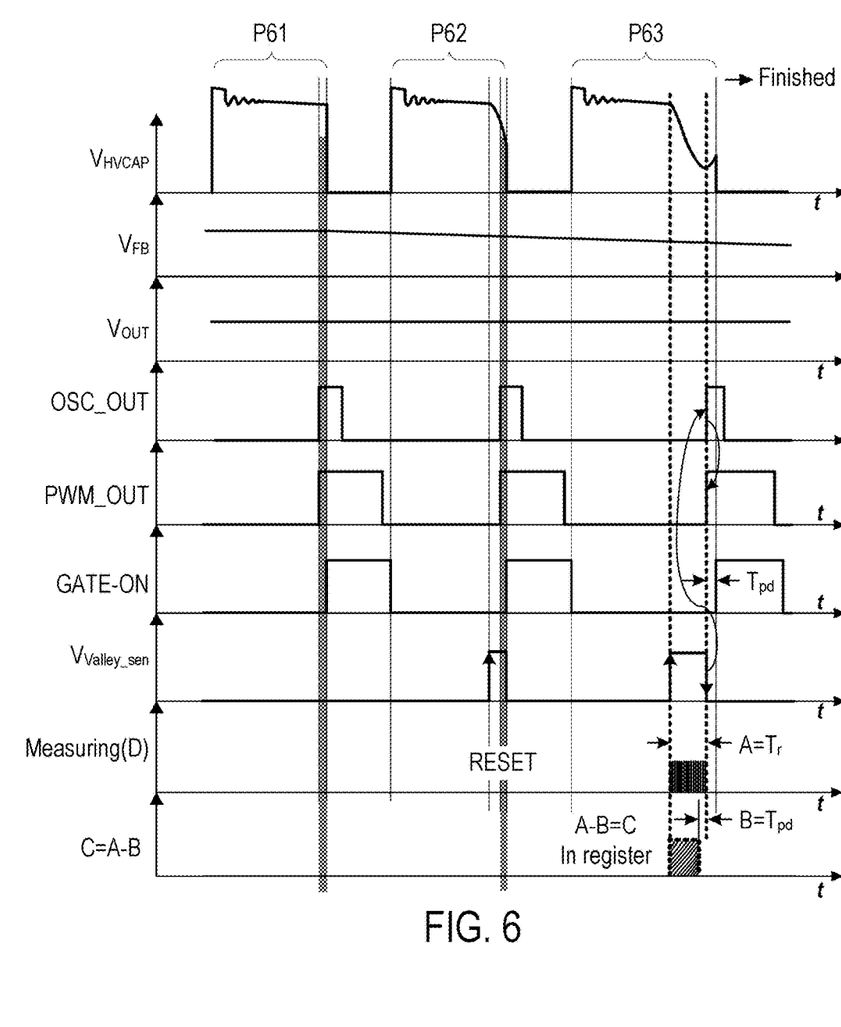
FIG. 6 is a waveform diagram illustrating the operation of acquiring the compensation value of FIG. 5 according to an embodiment of the present disclosure.

FIG. 5 is a flow chart illustrating an operation of acquiring a compensation value C of a switch controller according to an embodiment of the present disclosure. The switch controller of FIG. 5 may correspond to the switch controller 110 or 200 shown in FIG. 1 or 2, respectively. FIG. 6 is a waveform diagram illustrating the operation of acquiring the compensation value C of FIG. 5 according to an embodiment of the present disclosure. The operation of FIG. 5 will be described with reference to the switch controller 200 shown in FIG. 2 and the waveform diagram of FIG. 6.

The operation of acquiring the compensation value C is performed at an initialization stage of a power converter. At the initialization stage, an IC chip of the switch controller 200 is installed in the power converter and operates to tune its characteristics including the compensation value C.

Referring to FIG. 6, the valley detection block 211 in the auto-tuning valley detection circuit 210 of FIG. 2 senses a changing level of the voltage $V_{HVCAP}$ at the drain of the power switch SW and generates the valley sensing signal $V_{Valley\_sen}$ based on the sensing result. When a valley point of the voltage $V_{HVCAP}$ is detected by sensing the resonance of the voltage $V_{HVCAP}$, the valley sensing signal $V_{Valley\_sen}$ has a pulse width that corresponds to a quarter period $T_r$ of a resonant cycle of the voltage $V_{HVCAP}$. The valley sensing signal $V_{Valley\_sen}$ is provided to the compensation block 213 of FIG. 2. The compensation block 213 acquires the compensation value C based on the valley sensing signal $V_{Valley\_sen}$ and the propagation delay time $T_{pd}$. At this time, the PWM output signal PWM_OUT and the power switch control signal GATE_ON are generated based on the compensation value C and the valley sensing signal $V_{Valley\_sen}$.

However, at the beginning of the initialization stage, e.g., in a first period P61 in which the voltage $V_{HVCAP}$ is fluctuated, but does not start to be resonated yet, the valley sensing signal $V_{Valley\_sen}$ is not generated. At this time, the oscillator 221 of FIG. 2 operates at the fixed frequency and outputs the oscillation output signal OSC_OUT not depending on the valley sensing signal $V_{Valley\_sen}$, and thus the RS flip-flop 225 generates the PWM output signal PWM_OUT whose rising edge is synchronized with the oscillation output signal OSC_OUT.

After that, in a second period P62 in which the voltage $V_{HVCAP}$ starts to be resonated, but a first valley point of the voltage $V_{HVCAP}$ is not detected yet, the valley sensing signal $V_{Valley\_sen}$ is generated to have a pulse width D that is less than the quarter period $T_r$ of the resonant cycle of the voltage $V_{HVCAP}$. At this time, the oscillator 221 still operates at the fixed frequency, and the RS flip-flop 225 generates the PWM output signal PWM_OUT based on the oscillation output signal OSC_OUT. In the second period P62, even though the valley sensing signal $V_{Valley\_sen}$ is generated, but a pulse of the valley sensing signal $V_{Valley\_sen}$ overlaps a pulse of the PWM output signal PWM_OUT. When the pulse of the valley sensing signal $V_{Valley\_sen}$ overlaps the pulse of the PWM output signal PWM_OUT, the pulse of the valley sensing signal $V_{Valley\_sen}$ is ignored, i.e., reset. Therefore, the oscillation output signal OSC_OUT is not generated based on the valley sensing signal $V_{Valley\_sen}$.

After that, in a third period P63 in which the voltage $V_{HVCAP}$ is sufficiently resonated and thus the first valley point of the voltage $V_{HVCAP}$ is detected, the valley sensing signal $V_{Valley\_sen}$ is generated to have a pulse width D that is equal to the quarter period $T_r$ of the resonant cycle of the voltage $V_{HVCAP}$. At this time, the oscillator 221 outputs the oscillation output signal OSC_OUT in response to the valley sensing signal $V_{Valley\_sen}$, and the RS flip-flop 225 generates the PWM output signal PWM_OUT to be synchronized with the oscillation output signal OSC_OUT that is generated based on the valley sensing signal $V_{Valley\_sen}$. Therefore, the valley sensing signal $V_{Valley\_sen}$ does not overlap the PWM output signal PWM_OUT anymore.

Referring to FIGS. 2 and 5, at the initialization stage, the compensation block 213 determines whether a rising edge of the valley sensing signal $V_{Valley\_sen}$ is detected or not at S510. When the rising edge of the valley sensing signal $V_{Valley\_sen}$ is not detected, the compensation block 213 repeatedly performs the detection of the rising edge at S510.

When the rising edge of the valley sensing signal $V_{Valley\_sen}$ is detected as in the second and third periods P62 and P63 of FIG. 6, the compensation block 213 measures the pulse width D of the valley sensing signal $V_{Valley\_sen}$ at S520.

At S530, the compensation block 213 determines whether the pulse of the valley sensing signal $V_{Valley\_sen}$ overlaps the pulse of the PWM output signal PWM_OUT or not. When it is determined that the pulse of the valley sensing signal $V_{Valley\_sen}$ overlaps the pulse of the PWM output signal PWM_OUT as in the second period P62 of FIG. 6, the compensation block 213 resets the measured pulse width D of the valley sensing signal $V_{Valley\_sen}$ at S540, and the process returns to S510.

On the other hand, when it is determined at S530 that the pulse of the valley sensing signal $V_{Valley\_sen}$ does not overlap the pulse of the PWM output signal PWM_OUT as in the third period P62 of FIG. 6, at S550, the compensation block 213 stores the measured pulse width D of the valley sensing signal $V_{Valley\_sen}$ in the register array 215 included in the compensation block 213 of FIG. 2. At this time, the measured pulse width D of the valley sensing signal $V_{Valley\_sen}$ corresponds to a quarter period $T_r$ of a resonant cycle of the voltage $V_{HVCAP}$ when the first valley point of the voltage $V_{HVCAP}$ is detected. Therefore, the pulse width $T_r$ of the valley sensing signal $V_{Valley\_sen}$ is stored in the register array 215 as a value 'A.'

As can be seen from the period P63 of FIG. 6, when the first valley point of the voltage $V_{HVCAP}$ is detected and thus the valley sensing signal $V_{Valley\_sen}$ has the pulse width $T_r$, the oscillation output signal OSC_OUT rises up in response to a falling edge of the valley sensing signal $V_{Valley\_sen}$. Therefore, the rising edge of the PWM output signal PWM_OUT, which is synchronized with a rising edge of the oscillation output signal OSC_OUT, is generated based on the falling edge of the valley sensing signal $V_{Valley\_sen}$. As a result, the pulse of the valley sensing signal $V_{Valley\_sen}$ does not overlap the pulse of the PWM output signal PWM_OUT anymore.

Referring to FIG. 2, the PWM output signal PWM_OUT and the power switch control signal GATE_ON are generated based on the valley sensing signal $V_{Valley\_sen}$ and provided to the compensation block 213. Therefore, the compensation block 213 calculates the propagation delay time $T_{pd}$ by measuring a phase difference between rising edges of the PWM output signal PWM_OUT and the power switch control signal GATE_ON at S560.

The compensation block 213 stores the measured propagation delay time $T_{pd}$ in the register array 215 included in the compensation block 213 of FIG. 2 at S570. The measured propagation delay time $T_{pd}$ is stored as a value 'B.'

At S580, the compensation block 213 determines whether the pulse width $T_r$ (A) and the propagation delay time $T_{pd}$ (B) have been stored in the register array 215 or not. When it is determined at S580 that at least one of the pulse width $T_r$ (A) and propagation delay time $T_{pd}$ (B) has not been stored in the register array 215, the process returns to S520 and/or S560 to measure the at least one of the pulse width $T_r$ and the propagation delay time $T_{pd}$.

On the other hand, when it is determined at S580 that both the pulse width $T_r$ (A) and the propagation delay time $T_{pd}$ (B) have been stored in the register array 215, the compensation block 213 determines the compensation value C by calculating a difference between the propagation delay time $T_{pd}$ and the pulse width $T_r$, and stores the compensation value C in the register array 215 at S590.

In an embodiment, in the operation of acquiring the compensation value C described in FIG. 5, the compensation block 213 measures the pulse width $T_r$ and the propagation delay time $T_{pd}$ using the counter 214 included in the compensation block 213 of FIG. 2. In an embodiment, the counter 214 generates a clock signal to measure the pulse width $T_r$ and the propagation delay time $T_{pd}$. Therefore, each of the pulse width $T_r$ (A), the propagation delay time $T_{pd}$ (B), and the compensation value C may be represented by the number of cycles of the clock signal corresponding thereto. When the compensation value C is determined and stored as described above, the compensation block 213 terminates the operation of acquiring the compensation value C.

After the switch controller 110 or 200 is installed in the power converter 100 and its initialization stage including the operation of acquiring the compensation value C ends, the switch controller 110 or 200 performs its normal operation when the power converter 100 performs its operation.

Figure 7:
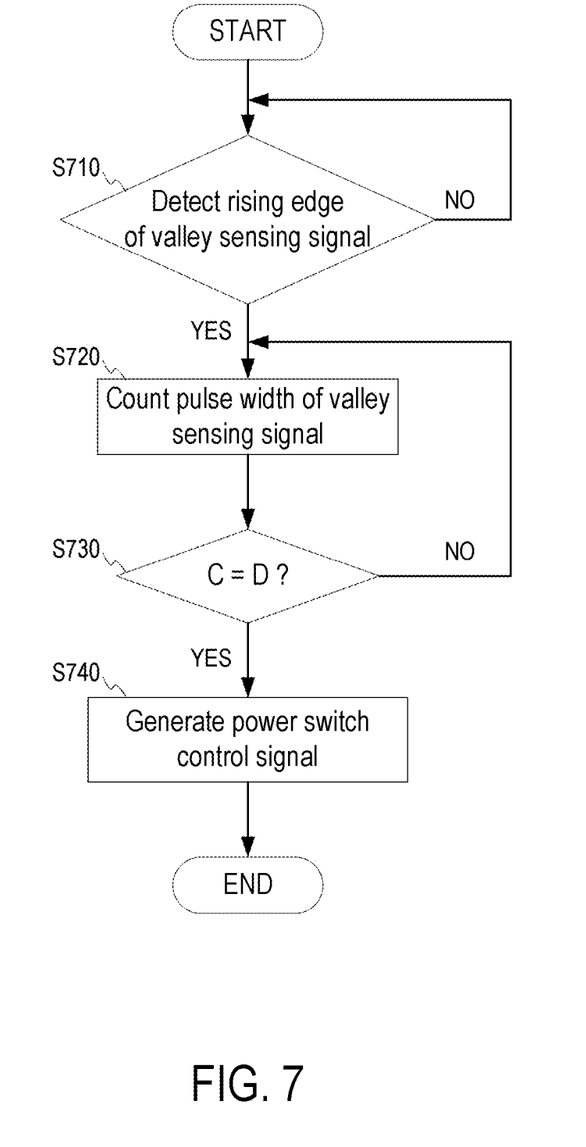
FIG. 7 is a flow chart illustrating a normal operation of a switch controller according to an embodiment of the present disclosure.
Figure 8:
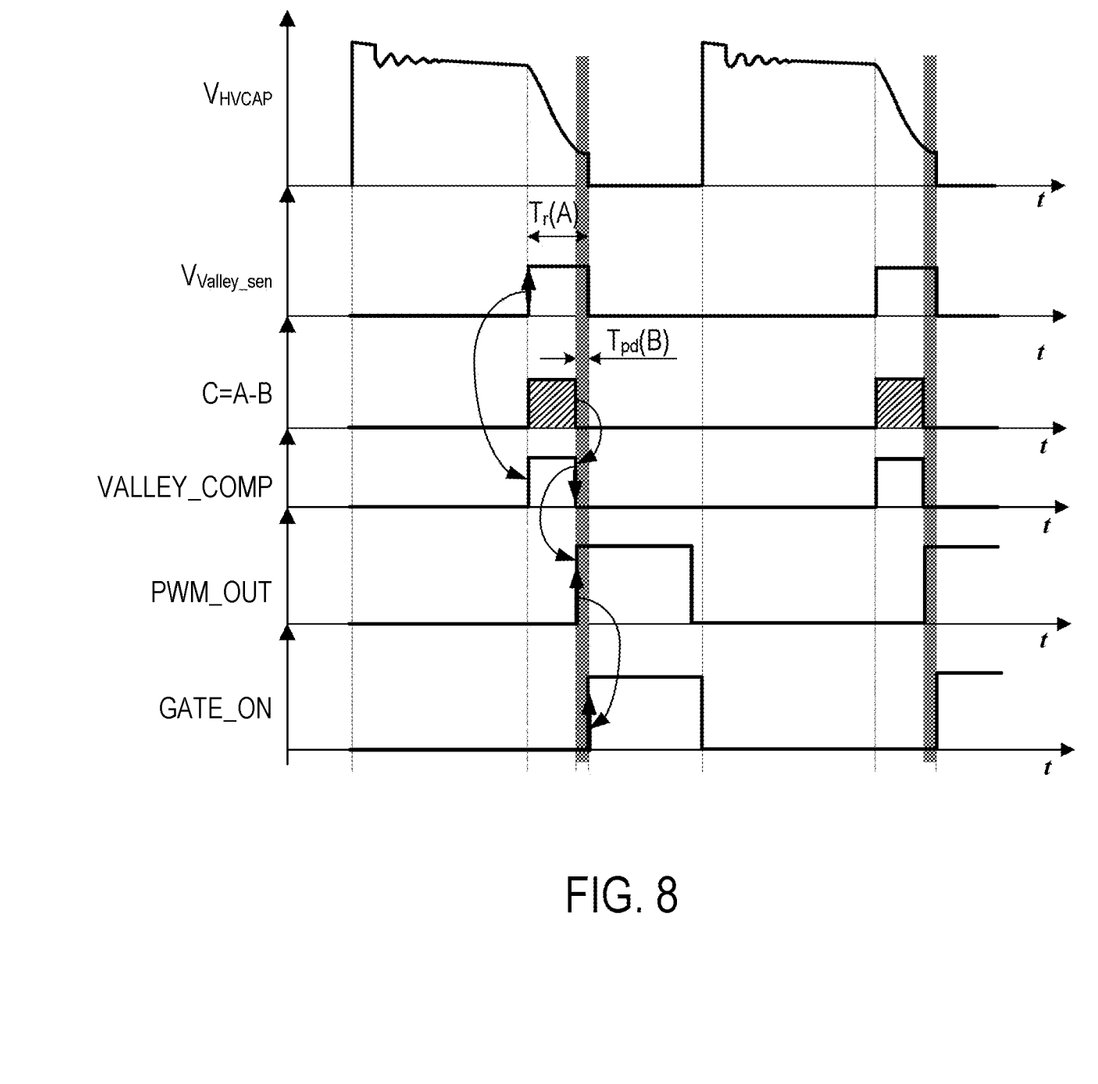
FIG. 8 is a waveform diagram illustrating the normal operation of FIG. 7 according to an embodiment of the present disclosure.

FIG. 7 is a flow chart illustrating a normal operation of a switch controller according to an embodiment of the present disclosure. The switch controller of FIG. 7 may correspond to the switch controller 110 or 200 of FIG. 1 or 2, respectively. FIG. 8 is a waveform diagram illustrating the normal operation of FIG. 7 according to an embodiment of the present disclosure. The normal operation of FIG. 7 will be described with reference to the switch controller 200 shown in FIG. 2 and the waveform diagram of FIG. 8.

When the valley detection block 211 of FIG. 2 detects a valley point of the voltage $V_{HVCAP}$ at the drain of the power switch SW and generates the valley sensing signal $V_{Valley\_sen}$ to the compensation block 213 of FIG. 2, the compensation block 213 determines whether a first edge, e.g., a rising edge, of the valley sensing signal $V_{Valley\_sen}$ is detected at S710.

When the rising edge of the valley sensing signal $V_{Valley\_sen}$ is detected at S710, the compensation block 213 starts to count, using the clock signal of the counter 214, a pulse width D of the valley sensing signal $V_{Valley\_sen}$ from the rising edge of the valley sensing signal $V_{Valley\_sen}$ at S720.

At S730, the compensation block 213 determines whether the counted pulse width D reaches the compensation value C. If the counted pulse width D does not reach the compensation value C, the process returns to S720 and the counting process continues, If the counted pulse width D reaches the compensation value C, at S740, the compensation block 213 generates a second edge, e.g., a falling edge, of the compensated valley sensing signal VALLEY_COMP, and the RS flip-flop 225 generates the PWM output signal PWM_OUT that is enabled based on the falling edge of the compensated valley sensing signal VALLEY_COMP. That is, when the compensated valley sensing signal VALLEY_COMP transitions to a low level, the PWM output signal PWM_OUT may be enabled to a high level. However, embodiments are not limited thereto. In other embodiment, the levels of compensated valley sensing signal VALLEY_COMP and the PWM output signal PWM_OUT may be properly changed.

As shown in FIG. 8, the compensated valley sensing signal VALLEY_COMP has the first edge, i.e., the rising edge, that is determined by the rising edge of the valley sensing signal $V_{Valley\_sen}$ and a pulse width that is determined by the compensation value C. The falling edge of the compensated valley sensing signal VALLEY_COMP is determined when the counted pulse width D reaches the compensation value C.

When the compensated valley sensing signal VALLEY_COMP is provided to the RS flip-flop 225 through the oscillator 221 of FIG. 2, the RS flip-flop 225 generates the PWM output signal PWM_OUT having the rising edge that is determined by the falling edge of the compensated valley sensing signal VALLEY_COMP as shown in FIG. 8.

The gate driver 227 of FIG. 2 generates the power switch control signal GATE_ON having a rising edge that is delayed for the propagation delay time $T_{pd}$ from the rising edge of the PWM output signal PWM_OUT. The power switch SW is turned on at the rising edge of the power switch control signal GATE_ON.

Since, as described above with reference to FIG. 6, the compensation value C is determined by calculating the difference between the propagation delay time $T_{pd}$ (B) and the pulse width $T_r$ (A) corresponding to the quarter period of the resonant cycle of the voltage $V_{HVCAP}$, the rising edge of the PWM output signal PWM_OUT is generated the propagation delay time $T_{pd}$ (B) earlier than the falling edge of the valley sensing signal $V_{Valley\_sen}$ by the falling edge of the compensated valley sensing signal VALLEY_COMP to thereby compensate for the propagation delay time $T_{pd}$, as shown in FIG. 8.

After that, the rising edge of the power switch control signal GATE_ON is generated the propagation delay time $T_{pd}$ (B) after the rising edge of the PWM output signal PWM_OUT since there is the propagation delay time $T_{pd}$ (B) between generating the rising edge of the PWM output signal PWM_OUT and generating the rising edge of the power switch control signal GATE_ON. As a result, the rising edge of the power switch control signal GATE_ON is generated to be synchronized with the falling edge of the valley sensing signal $V_{Valley\_sen}$ that is synchronized with the valley point of the voltage $V_{HVCAP}$, and thus the power switch SW can be actually turned on at the valley point of the voltage $V_{HVCAP}$.

According to the embodiments of the present disclosure, a switch controller of a power converter can detect or sense an accurate valley point of a drain voltage of a power switch using a differentiator that implements a capacitive valley sensing method, and compensate for a propagation delay time, which occurs in the switch controller and the power switch, using a compensation value that is generated based on a quarter period of a resonant cycle of the drain voltage and the propagation delay time. Therefore, the power switch can be turned on at a time that is substantially the same as a time corresponding to a selected valley point of the drain voltage of the power switch. As a result, it is possible to reduce the switching loss of the power switch and therefore to help the power converter to operate at improved efficiency.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method for operating a switch controller, the method comprising:
   determining a compensation value based on a quarter period of a resonant cycle of a drain voltage and a propagation delay time, the drain voltage being a voltage at a drain of a power switch;
   generating a sensing signal based on detection of a valley point of the drain voltage; and
   generating a control signal for controlling the power switch based on the sensing signal and the compensation value to turn on the power switch at a time corresponding to the valley point of the drain voltage.

2. The method of claim 1, further comprising:
   measuring the quarter period of the resonant cycle when a first valley point of the drain voltage is detected after the switch controller is installed; and
   measuring the propagation delay time occurring in the switch controller,
   wherein the compensation value is determined by calculating a difference between the quarter period and the propagation delay time.

3. The method of claim 2, further comprising:
determining, as the propagation delay time, a phase difference between a pulse width modulation (PWM) output signal and the control signal, the control signal being generated based on the PWM output signal.

4. The method of claim 3, wherein the quarter period is measured by counting a pulse width of the sensing signal, and the propagation delay time is measured by counting the phase difference between the PWM output signal and the control signal.

5. The method of claim 4, wherein the quarter period is determined when a pulse of the sensing signal does not overlap a pulse of the PWM output signal.

6. The method of claim 1, further comprising:
generating a current signal by sensing the drain voltage using a capacitor, the current signal having a sinusoidal waveform;
generating a regulated voltage signal by regulating the current signal; and
generating the sensing signal based on the regulated voltage signal.

7. The method of claim 6, further comprising:
comparing the regulated voltage signal with an offset voltage to generate a comparison signal; and
selecting one of pulses of the comparison signal as the sensing signal when two or more valley points are detected and the pulses of the comparison signal correspond to the two or more valley points,
wherein the sensing signal has a pulse width corresponding to the quarter period.

8. The method of claim 1, further comprising:
generating a compensated sensing signal based on the sensing signal and the compensation value, the compensated sensing signal having a first edge synchronized with a first edge of the sensing signal, and a second edge determined after a time period corresponding to the compensation value passes from the first edge of the compensated sensing signal;
generating a first edge of a PWM output signal that is synchronized with the second edge of the compensated sensing signal; and
generating the control signal having a first edge that is delayed for the propagation delay time from the first edge of the PWM output signal,
wherein the power switch is turned on in response to the first edge of the control signal.

9. A switch controller, comprising:
a detection circuit configured to determine a compensation value based on a quarter period of a resonant cycle of a drain voltage and a propagation delay time, generate a sensing signal based on detection of a valley point of the drain voltage, and generate a compensated sensing signal based on the sensing signal and the compensation value, the drain voltage being a voltage at a drain of a power switch; and
a control circuit configured to generate a control signal for controlling the power switch based on the compensated sensing signal to turn on the power switch at a time corresponding to the valley point of the drain voltage.

10. The switch controller of claim 9, wherein the detection circuit comprises:
a detection block configured to generate the sensing signal based on the detection of the valley point of the drain voltage; and
a compensation block configured to measure the quarter period based on the sensing signal, measure the propagation delay time occurring in the control circuit, determine the compensation value based on the quarter period and the propagation delay time, and generate the compensated sensing signal based on the sensing signal and the compensation value.

11. The switch controller of claim 10, wherein the compensation block comprises:
a counter configured to generate a clock signal to measure the quarter period, the propagation delay time, the compensation value, a pulse width of the sensing signal; and
a register array configured to store the quarter period, the propagation delay time, the compensation value.

12. The switch controller of claim 10, wherein the detection block comprises:
a differentiator configured to sense the drain voltage and generate a current signal having a sinusoidal waveform;
a voltage regulator configured to regulate the current signal and generate a regulated voltage signal; and
a voltage generator configured to convert the regulated voltage signal into the sensing signal having a pulse corresponding to the quarter period.

13. The switch controller of claim 12, wherein the voltage generator comprises:
a comparator configured to compare the regulated voltage signal with an offset voltage and output a comparison signal; and
a screener configured to generate a screening signal to pass a pulse of the comparison signal as the sensing signal, the pulse of the comparison signal corresponding to one of valley points detected while the drain voltage resonates.

14. The switch controller of claim 12, wherein the differentiator comprises a high voltage capacitor coupled between the drain of the power switch and the voltage regulator.

15. The switch controller of claim 9, wherein the control circuit comprises:
a PWM controller configured to generate a PWM control signal for controlling a pulse width of the control signal based on the compensated sensing signal and a switch turn-off control signal; and
a gate driver configured to generate the control signal based on the PWM control signal.

16. A power converter, comprising:
a transformer including a primary winding and a secondary winding;
a power switch including a drain coupled to the primary winding; and
a switch controller, comprising:
a detection circuit configured to determine a compensation value based on a quarter period of a resonant cycle of a drain voltage and a propagation delay time, generate a sensing signal based on detection of a valley point of the drain voltage, and generate a compensated sensing signal based on the sensing signal and the compensation value, the drain voltage being a voltage at a drain of the power switch; and
a control circuit configured to generate a control signal for controlling the power switch based on the compensated sensing signal to turn on the power switch at a time corresponding to the valley point of the drain voltage.

17. The power converter of claim 16, wherein the detection circuit comprises:
a detection block configured to generate the sensing signal based on the detection of the valley point of the drain voltage; and a compensation block configured to measure the quarter period based on the sensing signal, measure the propagation delay time occurring in the control circuit, determine the compensation value based on the quarter period and the propagation delay time, and generate the compensated sensing signal based on the sensing signal and the compensation value.

18. The power converter of claim 17, wherein the detection block comprises:
- a differentiator configured to sense the drain voltage and generate a current signal having a sinusoidal waveform;
- a voltage regulator configured to regulate the current signal and generate a regulated voltage signal; and
- a voltage generator configured to convert the regulated voltage signal into the sensing signal having a pulse corresponding to the quarter period.

19. The power converter of claim 18, wherein the voltage generator comprises:
- a comparator configured to compare the regulated voltage signal with an offset voltage and output a comparison signal; and
- a screener configured to generate a screening signal to pass a pulse of the comparison signal as the sensing signal, the pulse of the comparison signal corresponding to one of valley points detected while the drain voltage resonates.

20. The power converter of claim 16, wherein the control circuit comprises:
- a PWM controller configured to generate a PWM control signal for controlling a pulse width of the control signal based on the compensated sensing signal and a switch turn-off control signal; and
- a gate driver configured to generate the control signal based on the PWM control signal.

* * * * *